(12) United States Patent
Navilappa

(10) Patent No.: US 9,594,621 B1
(45) Date of Patent: Mar. 14, 2017

(54) ONLINE NETWORK DEVICE DIAGNOSTIC MONITORING AND FAULT RECOVERY SYSTEM

(71) Applicant: Juniper Networks, Inc., Sunnyvale, CA (US)

(72) Inventor: Manjunath Mandigatta Navilappa, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 114 days.

(21) Appl. No.: 14/585,497

(22) Filed: Dec. 30, 2014

(51) Int. Cl.
  *G06F 11/00* (2006.01)
  *G06F 11/07* (2006.01)
  *H04L 12/24* (2006.01)
  *H04L 12/26* (2006.01)

(52) U.S. Cl.
  CPC ...... *G06F 11/0793* (2013.01); *G06F 11/0772* (2013.01); *H04L 41/0686* (2013.01); *H04L 43/04* (2013.01)

(58) Field of Classification Search
  CPC ............. G06F 11/0772; G06F 11/0793; H04L 41/0686; H04L 43/04
  See application file for complete search history.

(56) References Cited

U.S. PATENT DOCUMENTS

| | | | |
|---|---|---|---|
| 7,184,437 B1 | 2/2007 | Cole et al. | |
| 8,050,559 B2 | 11/2011 | Sindhu | |
| 8,339,959 B1 | 12/2012 | Moisand et al. | |
| 2002/0059404 A1* | 5/2002 | Schaaf | H04L 41/0233 709/220 |
| 2013/0124309 A1* | 5/2013 | Traasdahl | H04L 67/22 705/14.49 |
| 2014/0229944 A1* | 8/2014 | Wang | G06F 9/5088 718/1 |
| 2015/0229729 A1* | 8/2015 | van der Heijden | G06Q 30/02 705/14.45 |
| 2015/0269702 A1* | 9/2015 | Miasnik | G06Q 10/00 705/325 |

* cited by examiner

Primary Examiner — Joshua P Lottich
(74) Attorney, Agent, or Firm — Shumaker & Sieffert, P.A.

(57) ABSTRACT

An online network device monitoring and recovery system generates, based at least in part on a schema that describes entities included in a network device, a software entity profile of entity object instances that represent the entities included in the network device, the entities including both hardware components and interfaces between the hardware components. The system registers the software entity profile to one or more proxies implemented on the network device. The system receives diagnostic information corresponding to a respective entity from the plurality of entities represented in the software entity profile registered to the one or more proxies. The system communicates diagnostic information for the respective entity, and a respective connective path through the entities for the respective entity based at least in part on the software entity profile.

21 Claims, 9 Drawing Sheets

ONLINE NETWORK DEVICE DIAGNOSTIC MONITORING AND FAULT RECOVERY SYSTEM

TECHNICAL FIELD

The invention relates to computer network devices and, more particularly, to diagnostics for computer network devices.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

Network service providers, for example an Internet service provider, must meet increasing bandwidth demands. This requires service providers to continuously add, replace, and upgrade routing equipment within their networks. Equipment replacement and upgrades can be a challenge for service providers. As networks expand, administrative time and costs required to manage routing equipment also increase. As a result, service providers continuously seek to reduce time and expense associated with upgrading and managing network routing systems.

One way to meet increasing bandwidth needs is to use multi-chassis routers, routers in which multiple routing devices are physically coupled and configured to operate as a single routing node. Because multi-chassis routers combine resources of multiple routing devices, multi-chassis routers have much higher bandwidth capabilities than standalone routers. For example, the use of multi-chassis routers can simplify and improve routing on a service provider network by consolidating routing functions onto fewer routers. However, the individual configuration and management of each device of a multi-chassis router can be a significant challenge.

SUMMARY

The principles of this disclosure relate to online computer network device diagnostic and recovery systems for network devices. An online network device diagnostic and recovery system of this disclosure may model the system of components and interfaces in a network device as a data structure such as a graph, which may enable the diagnostic and recovery system to proactively and precisely monitor network device resources, detect and audit faults, and take centralized recovery actions in the network device, while enabling the network device to remain online and operational during the fault recovery operation. Because the diagnostic and recovery system has a model of the hardware components and the interfaces between the hardware components, when the diagnostic and recovery system detects a fault or anomaly, it can react based its knowledge of all the components and interconnections as represented in the model. An online network device diagnostic and recovery system may serve as a standard infrastructure to provide proactive, fine-grained, resilient diagnostic monitoring and fault recovery of network device components and interfaces.

For example, according to one embodiment, a method for online network device diagnostics includes generating, by a network device monitoring and recovery system and based at least in part on a schema that describes a plurality of entities included in a network device, a software entity profile of entity object instances that represent the plurality of entities included in the network device, the entities including both hardware components and interfaces between the hardware components. The method further includes registering, by the network device monitoring and recovery system, the software entity profile to one or more proxies implemented on the network device. The method further includes receiving, by at least one respective proxy of the one or more proxies implemented on the network device, diagnostic information corresponding to a respective entity from the plurality of entities represented in the software entity profile registered to the one or more proxies. The method further includes communicating, by the at least one proxy of the one or more proxies to a response subsystem, the diagnostic information for the respective entity, and a respective connective path through the entities for the respective entity based at least in part on the software entity profile.

In another embodiment, an online network diagnostic monitoring and fault recovery system includes a network device monitoring and recovery system and one or more proxies implemented on a network device. The network device monitoring and recovery system is configured to generate, based at least in part on a schema that describes a plurality of entities included in the network device, a software entity profile of entity object instances that represent the plurality of entities included in the network device, the entities including both hardware components and interfaces between the hardware components. The network device monitoring and recovery system is further configured to register the software entity profile to the one or more proxies implemented on the network device. At least one respective proxy of the one or more proxies implemented on the network device is configured to receive diagnostic information corresponding to a respective entity from the plurality of entities represented in the software entity profile registered to the one or more proxies. The at least one respective proxy of the one or more proxies is further configured to communicate the diagnostic information for the respective entity, and a respective connective path through the entities for the respective entity based at least in part on the software entity profile.

In another embodiment, a computer program product includes a computer-readable medium that includes instructions that cause at least one programmable processor to implement one or more proxies on a network device. The instructions further cause the at least one programmable processor to generate, based at least in part on a schema that describes a plurality of entities included in a network device, a software entity profile of entity object instances that represent the plurality of entities included in the network device, the entities including both hardware components and interfaces between the hardware components. The instructions further cause the at least one programmable processor to register the software entity profile to one or more proxies implemented on the network device. The instructions further cause the at least one programmable processor to cause at least one respective proxy of the one or more proxies implemented on the network device to receive diagnostic information corresponding to a respective entity from the plurality of entities represented in the software entity profile registered to the one or more proxies. The instructions further cause the at least one programmable processor to cause the at least one proxy of the one or more proxies to communicate, to a response subsystem, the diagnostic information for the respective entity, and a respective connective path through the entities for the respective entity based at least in part on the software entity profile.

The details of one or more embodiments of the invention are set forth in the accompanying drawings and the description below. Other features, objects, and advantages of the invention will be apparent from the description and drawings, and from the claims.

DETAILED DESCRIPTION

Online computer network device diagnostic and recovery systems of this disclosure may be useful in a wide variety of network devices, such as chassis-based routers. Examples of network devices with which implementations of this disclosure may be usefully deployed are described as follows.

Figure 1:
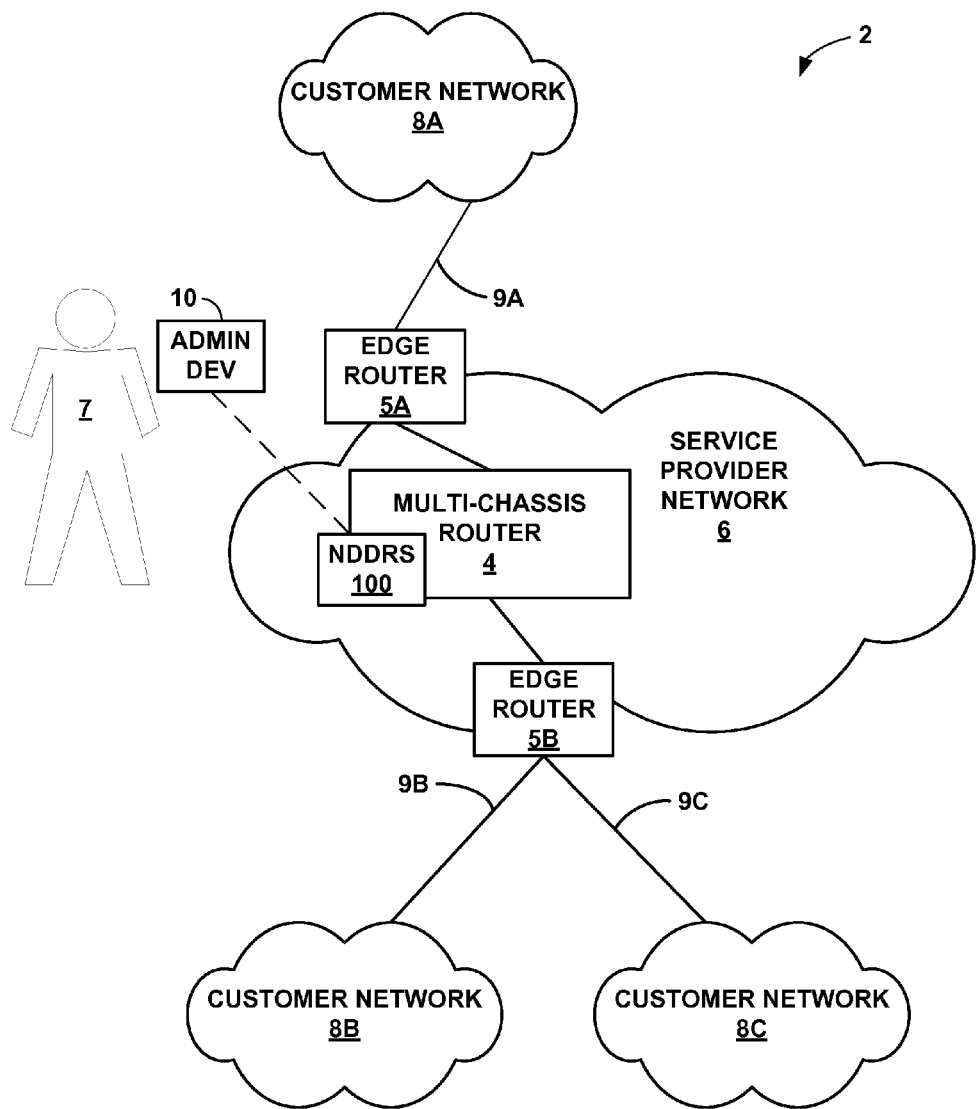
FIG. 1 is a conceptual block diagram of an example system in which a service-provider network includes a multi-chassis router.

FIG. 1 is a block diagram illustrating an example system 2 in which service provider network 6 includes a multi-chassis router 4. In this example, multi-chassis router 4 communicates with edge routers 5A and 5B ("edge routers 5") to provide customer networks 8A-8C ("customer networks 8") with access to network 6. As described in further detail below, in one embodiment multi-chassis router 4 includes a switch card chassis (SCC) that operates as a control node and can include, for example, four line card chassis (LCCs) that operate as packet routing devices. The LCCs contain all the physical interfaces for coupling to other devices within network 6, while the SCC controls and routes traffic between the LCCs.

Although not illustrated, service provider network 6 may be coupled to one or more networks administered by other service providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within the customer networks to communicate with each other. Service provider network 6 may include a variety of network devices other than multi-chassis router 4 and edge routers 5, such as additional routers, switches, servers, and the like.

In the illustrated embodiment, edge router 5A is coupled to customer network 8A via access link 9A and edge router 5B is coupled to customer networks 8B and 8C via access links 9B and 9C, respectively. Customer networks 8 may be networks for geographically separated sites of an enterprise. Each of customer networks 8 may include one or more computing devices (not shown), such as personal computers, laptop computers, handheld computers, workstations, servers, switches, printers, or other devices. The configuration of network 2 illustrated in FIG. 1 is merely exemplary. For example, service provider network 6 may be coupled to any number of customer networks 8. Nonetheless, for ease of description, only customer networks 8A-8C are illustrated in FIG. 1.

Administrator 7 may control, query and monitor multi-chassis router 4 via an administrator device 10 connected to multi-chassis router 4. Additionally, administrator 7 may interact with multi-chassis router 4 in other ways, such as via a user interface, e.g., a command line interface (CLI), presented by multi-chassis router 4.

The user interface operates in accordance with a configuration syntax for a standalone router that has been extended to transparently provide and support multi-chassis router semantics. Specifically, the user interface supports a generalized command set of a standalone router to transparently configure and manage multi-chassis router 4. In this manner, the user interface provides a single point of configuration for the multiple routing devices operating within multi-chassis router 4. As a result, administrator 7 is able to interact with the user interface as if he or she is configuring a standalone router. The extended configuration syntax supported by the user interface allows administrator 7 to configure multi-chassis router 4 in an intuitive manner that is generally consistent with the administrator's previous interactions with standalone routers. The control node of multi-chassis router 4 automatically propagates commands and configuration data to each of the routing devices that form the multi-chassis router, and provides automated control over the distributed configuration process.

In a similar manner, the control node may provide a single point of interaction by which administrator 7 may install and update software on multi-chassis router 4. For example, the control node (e.g., the SCC) of multi-chassis router 4 provides a user interface by which administrator 7 uploads new or updated software. In turn, the control node manages a distributed installation process during which the software is installed on the individual routing devices that form multi-chassis router 4. Consequently, when installing and maintaining the routing protocols and other software executed by multi-chassis router 4, administrator 7 may interact with the multi-chassis router 4 as if the router were a standalone router.

Multi-chassis router 4 has a network device diagnostic and recovery system 100 of this disclosure loaded and executing thereon. Network device diagnostic and recovery system 100 may generate and store a software entity profile of the hardware components and interfaces between the hardware components in multi-chassis router 4, as further discussed below.

Figure 2:
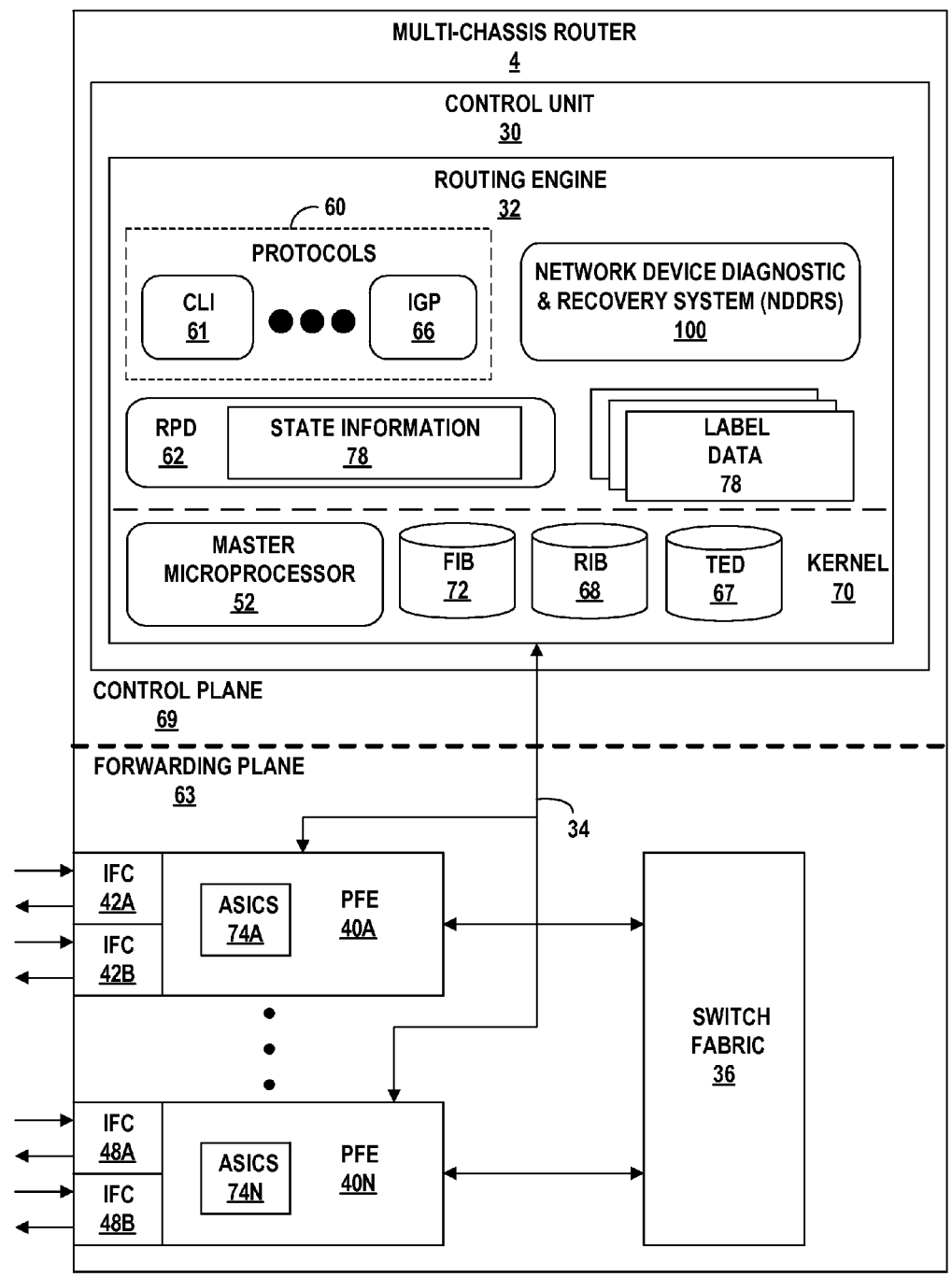
FIG. 2 is a block diagram illustrating an exemplary multi-chassis router that operates in accordance with the principles of the invention.

FIG. 2 is a block diagram illustrating exemplary details of multi-chassis router 4 shown in FIG. 1 implementing aspects of a network device diagnostic and recovery system 100, in accordance with techniques of this disclosure. In the example of FIG. 2, router 4 includes a separate control plane 69 and forwarding plane 63, which may be implemented in separate chassis. Control plane 69 includes control unit 30 in which routing engine 26 provides control plane functionality for router 4. Forwarding plane 63 includes a plurality of packet-forwarding engines 40A-40N ("PFEs 40") and a switch fabric 36 that collectively provide a forwarding plane for forwarding network traffic. An LCC of router 4 as discussed above may include one or more PFEs 40 and switch fabric 36 as shown in FIG. 2. While two exemplary PFEs 40 and one illustrative switch fabric 36 are shown in FIG. 2, a forwarding plane 63 of router 4 may include more than two PFEs 40 and more than one switch fabric 36, which may be included in multiple different LCCs.

PFEs 40 receive and send data packets via interface cards (IFCs) 42, 48. In other embodiments, each of PFEs 40 may comprise more or fewer IFCs. Although not shown, PFEs 40 may each comprise a central processing unit (CPU) and one or more memory components. In this example, routing engine 32 is connected to each of PFEs 40 by a dedicated internal communication link 34. For example, dedicated link 34 may comprise a Gigabit Ethernet connection. Switch fabric 36 provides a high-speed interconnect for forwarding incoming data packets between PFEs 40 for transmission over a network. U.S. Pat. No. 8,050,559, entitled "Multi-chassis router with multiplexed optical interconnects," describes a multi-chassis router in which a multi-stage switch fabric, such as a 3-stage Clos switch fabric, is used as a high-end forwarding plane to relay packets between multiple routing nodes of the multi-chassis router. The entire contents of U.S. Pat. No. 8,050,559 are incorporated herein by reference.

Routing engine 32 provides an operating environment for execution of various protocols 60 that may comprise software processes having instructions executed by a computing environment. As described in further detail below, protocols 60 provide control plane functions for storing network topology in the form of routing tables or other structures, executing routing protocols to communicate with peer routing devices and maintain and update the routing tables, and providing management interface(s) to allow user access and configuration of router 4. In this respect, routing engine 32 represents hardware or a combination of hardware and software that implements routing protocol daemon 62 ("RPD 62") and one or more routing protocols 60 by which routing information, stored in a routing information base 68 ("RIB 68"), may be exchanged with other routers. RPD 62 may resolve a topology of a network described or represented by routing information in RIB 68 to select or determine one or more routes through the network. One or more of routing protocols 60, such as IGP 66, maintains the routing information in RIB 68. IGP 66 interacts with kernel 70 (e.g., by way of API calls) to update RIB 68 based on routing protocol messages received by router 4. RIB 68 may include information defining the topology of the network, including one or more routing tables and/or link-state databases. RPD 62 and/or routing protocols 60 derive a forwarding information base (FIB) 72 in accordance with the routing information in RIB 68. RPD 62 may update forwarding plane 63 with routes from FIB 72, where PFEs 40A-40N ("PFEs 40") of forwarding plane 63 store these routes in respective PFE FIBS.

Further details of one example embodiment of router 4 can be found in U.S. Pat. No. 8,339,959, entitled "Streamlined packet forwarding using dynamic filters for routing and security in a shared forwarding plane," which is incorporated herein by reference. Control unit 30 may be implemented solely in software, or hardware, or may be implemented as a combination of software, hardware, or firmware. For example, control unit 30 may include one or more processors which execute software instructions. In that case, routing engine 32 may include various software modules or daemons (e.g., one or more routing protocol processes, user interfaces and the like), and control unit 30 may include a computer-readable storage medium, such as computer memory, hard disk drive, or flash drive, for storing executable instructions.

Typically, the routing information in RIB 68 defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 72 is generated based on selection of certain routes within the network and maps packet key information (e.g., destination information and other select information from a packet header) to one or more specific next hops and ultimately to one or more specific output interface ports of IFCs 42. Routing engine 32 may generate the FIB in the form of a radix tree having leaf nodes that represent destinations within the network. U.S. Pat. No. 7,184,437, entitled "Scalable route resolution," provides details on an exemplary embodiment of a router that utilizes a radix tree for route resolution, the contents of which is incorporated herein by reference in its entirety.

As shown in FIG. 2, command line interface daemon 61 ("CLI 61") provides an interface by which an administrator or other management entity may modify the configuration of router 4 using text-based commands. Protocols 60 executing within routing engine 32 may include one or more MPLS protocols for establishing an LSP, which may be accumulated by IGP 66. Protocols 60 may generate and maintain a traffic engineering database 67, including bandwidth reservations for paths associated with MPLS LSPs, and computes a shortest path or paths for an MPLS LSP based on specified constraints and bandwidth availability information associated with the links within the network. IGP 66 may, in turn, advertise the calculated bandwidth availability information in traffic engineering database (TED) 67 to other peer routers.

Routing engine 32 communicates data representative of a software copy of the FIB 72 into each of PFEs 40 to control forwarding of traffic within the forwarding plane. This allows the software FIB stored in memory (e.g., RAM) in each of PFEs 40 to be updated without degrading packet-forwarding performance of router 4. In some instances, routing engine 32 may derive separate and different software FIBs for each respective PFE 40. In addition, one or more of PFEs 40 include application-specific integrated circuits 74A-74N (ASICs 74) that PFEs 40 program with a hardware-copy of the FIB based on the software FIBs (e.g., physically reconfiguring ASICs 74 as hardware FIB versions of the software FIBs) copied to each respective PFE 40.

Kernel 70 executes on master microprocessor 52 and may comprise, for example, a UNIX operating system derivative such as Linux or Berkeley Software Distribution (BSD). Kernel 70 processes kernel calls from protocols 60 to generate forwarding information in the form of FIB 72 based on the network topology represented in RIB 68, e.g., performs route resolution and path selection. Typically, kernel 70 generates FIB 72 in the form of radix or other lookup trees to map packet information (e.g., header information having destination information and/or a label stack) to next hops and ultimately to interface ports of interface cards associated with respective PFEs 40. FIB 72 may associate, for example, network destinations with specific next hops and corresponding IFCs 42-48. For MPLS-related traffic forwarding, FIB 72 stores label information that includes an incoming label, an outgoing label, and a next hop for a packet.

Master microprocessor 52 executing kernel 70 programs PFEs 40 to install copies of the FIB 72. Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the structures indicated above or any other structure operable to perform techniques described herein.

In this example, ASICs 74 are microcode-controlled chipsets (e.g., forwarding circuits) programmably configured by a slave microprocessor executing on each of PFEs 40 and under the control of master microprocessor 52. When forwarding packets, control logic with each ASIC 74 traverses the forwarding information (FIB 72) received from routing engine 32 and, upon reaching a FIB entry for the packet (e.g., a leaf node), microcode-implemented control logic automatically selects a forwarding next hop and processes the packets in accordance with the operations defined within the next hop. In this way, ASICs 74 of PFEs 40 process packets by performing a series of operations on each packet over respective internal packet forwarding paths as the packets traverse the internal architecture of router 4. One or more of PFEs 40 may serve as an ingress PFE 40 or an egress PFE 40, and operations may be performed, for example, on each packet based on any of a corresponding ingress interface, an ingress PFE 40, an egress PFE 40, an egress interface, or other components of router 4 to which the packet is directed prior to egress, such as one or more service cards. PFEs 40 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 40 arranges forwarding structures as next hop data that can be chained together as a series of "hops" along an internal packet forwarding path for the network device. In many instances, the forwarding structures perform lookup operations within internal memory of ASICs 74, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 74 determines the manner in which a packet is forwarded or otherwise processed by a PFE 40 from its input interface on one of IFCs 42-48 to its output interface on one of IFCs 42-48.

Multi-chassis router 4 has a network device diagnostic and recovery system 100 of this disclosure loaded and executing thereon. Network device diagnostic and recovery system 100 may generate and store a software entity profile of the hardware components and interfaces between the hardware components in multi-chassis router 4, as further discussed below. In addition to routing engine 32 storing and/or executing aspects of network device diagnostic and recovery system 100 as shown in FIG. 2, individual PFEs and/or LCCs as discussed above may also store and/or execute an instance of at least an aspect or feature of network device diagnostic and recovery system 100 such as a monitoring proxy, a fault reporting manager, or a delegator, for example.

Figure 3:
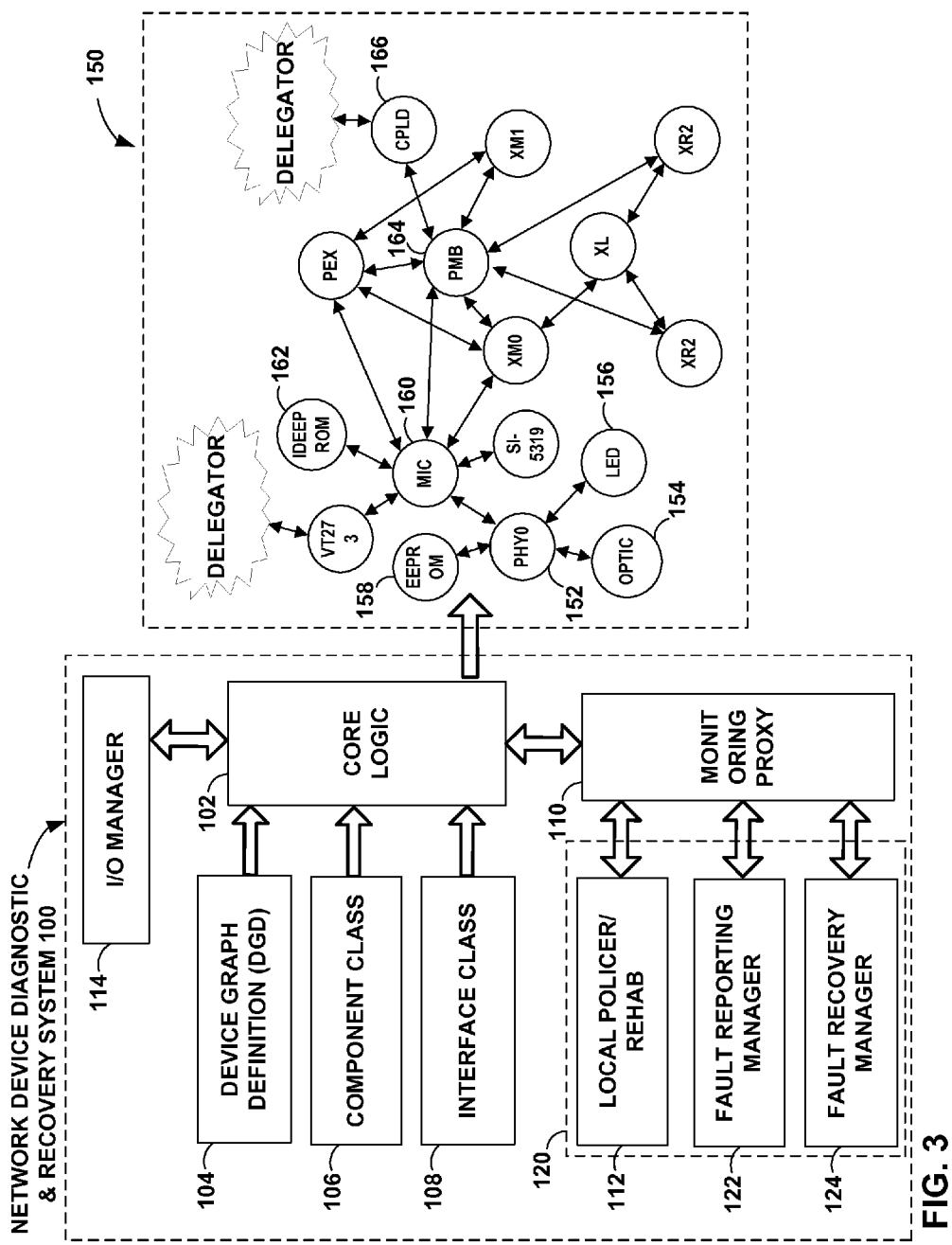
FIG. 3 is a block diagram illustrating an example online network diagnostic monitoring and fault recovery system connected to a network device.

FIG. 3 is a conceptual block diagram illustrating an example online network device diagnostic monitoring and fault recovery support system 100 ("network device monitoring and recovery system 100") connected to or implemented at a network device that includes components represented by network device graph 150. Network device graph 150 may be an example of a software entity profile that network device monitoring and recovery system 100 may generate to represent a network device, such as multi-chassis router 4 discussed above. Network device monitoring and recovery system 100 includes core logic 102, a device graph definition 104 ("DGD 104"), a component class 106, an interface class 108, a diagnostic monitoring proxy application template 110 ("monitoring proxy 110"), a local policer/rehab application template 112 ("local policer/rehab 112"), and an input/output (I/O) manager 114. Network device monitoring and recovery system 100 may also include a fault reporting manager 122 and a fault recovery manager 124, which may have client or hub-spoke relationships with monitoring proxy 110 to receive information from monitoring proxy 110. Local policer/rehab 112, fault reporting manager 122, and fault recovery manager 124 may collectively be referred to as a response subsystem 120. Monitoring proxy 110 may broadcast information it detects about a fault or anomaly among the entities of a network device represented by network device graph 150 such that fault reporting manager 122 and fault recovery manager 124 may receive the information about the fault or anomaly from monitoring proxy 110.

In some implementations, I/O manager 114 may include a user interface (UI) menu renderer, a command input manager, and a command output manager. The command input manager and command output manager may decouple input and output rendering, such that the input manager provides commands, and outputs are provided to the output manager. The components of network device monitoring and recovery system 100 indicated above may be implemented as software modules.

Network device graph 150 includes representations of a variety of hardware components and interfaces (or equivalently, interconnections) between the hardware components (depicted in FIG. 3 in circular form and as double-sided arrows). For example, the entities (components and interfaces/interconnections) represented by network device graph 150 include physical layer (PHY) device 152, optical device 154, light-emitting diode (LED) device 156, electrically erasable programmable read-only memory (EEPROM) 158, modular interface card (MIC) 160, ID EEPROM 162, processor subsystem (PMB) 164, complex programmable logic device (CPLD) 166, and so forth. Other hardware components of a network device represented by network device graph 150 may include any of a variety of field-replaceable units (FRUs) such as a master switch control board (SCB), a backup switch control board, a nonredundant switch control board, a master routing engine, a backup routing engine, a nonredundant routing engine, a solid-state drive (SSD) of a routing engine, a physical interface card (PIC), a modular interface card (MIC), a flexible PIC concentrator (FPC), a dense port concentrator (DPC), or a modular port concentrator (MPC). Network device graph 150 may represent a chassis-based router and may correspond to multi-chassis router 4 of FIGS. 1 and 2 in some examples. The components and interfaces between components represented by network device graph 150 may collectively be referred to as entities.

Network device monitoring and recovery system 100 may create a software entity profile, such as a software entity graph profile or a software entity table profile, that represents the component devices and the interconnections between the component devices in a network device, such as router 4. Network device monitoring and recovery system 100 may initially have stored in its data storage, or load into its data storage, a device graph definition (DGD) 104 or other schema that describes the components and interfaces included in a network device. DGD 104 may be a schema text file or other type of data set ("schema") that describes or represents the entities in the network device. Network device monitoring and recovery system 100 may also dynamically probe the network device when the network device boots up to determine what components are in the network device and what interfaces connect which components, and to record the results of this dynamic probing process in DGD 104 (or other schema or data set), and/or to use the results of this dynamic probing process in generating the software entity profile.

Network device monitoring and recovery system 100 may input DGD 104 or other schema to core logic 102. Core logic 102 may be implemented as a platform independent module that receives the schema as input and generates a software entity profile, e.g., a graph profile, based on the schema for platform software such as monitoring proxy 110 to use. The graph profile may include set of nodes and adjacencies between two or more of the nodes. (For purposes of the remaining description, a "graph" may refer to a software entity graph profile, with the understanding that other implementations may use a table or other type of software entity profile.) Core logic 102 may generate the software entity profile with entity object instances ("instances") that depict each of the component devices and interfaces of the network device. Core logic 102 may generate the software entity profile in the C programming language with each instance as a C struct, in some implementations. In other implementations, core logic 102 may generate the software entity profile in the Python programming language or any other suitable programming language.

Component class 106 and interface class 108 may each define a software and data structure with function pointers or method pointers that each serve as a general basis for specific instances of components and interfaces, respectively, of a network device. Core logic 102 may generate each component instance with inheritance from base component class 106 and each interface instance with inheritance from base interface class 108, but as instances of the specific types of entity based on the published type of component or interface. For example, core logic 102 may generate a component instance for a lookup (LU) ASIC included in the network device based on component class 106 but specified by core logic 102 as an instance of a lookup type object. As another example directed to an interface, core logic 102 may generate an interface instance for an inter-integrated circuit (I2C) bus included in the network device based on interface class 108 but specified by core logic 102 as an instance of an I2C bus interface type object. A component included in the network device has information on its directly connected interfaces, and an interface included in the network device has information on its directly connected components, but a particular interface does not contain information on its next hop interfaces, or the interfaces connected to the components to which the particular interface is connected.

After core logic 102 has instantiated or generated instances of all of the entities in the network device, core logic 102 may monitor each entity. Each component instance has standard function pointers that network device monitoring and recovery system 100 may invoke to perform a specific action in relation to the respective instance. Thus, core logic 102 may maintain information on all of the actions by the network device and updates to the software entity profile. Other modules are abstracted and identify devices by their logic names in the software entity profile. Core logic 102 may identify faults or anomalies among the components and/or interfaces (collectively, the entities) by standard fault IDs and standard anomaly IDs. In this context, a "fault" may be any failure or performance breakdown of an entity, and an "anomaly" may be any other type of unexpected or poor performance by the entity. Poor performance by an entity may be performance of the entity that falls below or fails to satisfy a nominal or selected performance threshold.

Network device monitoring and recovery system 100 may register each of the components and interfaces of the network device, along with a logical entity name and a monitoring protocol specific to each of at least some of the components and interfaces, with monitoring proxy 110. An individual entity may specify its monitoring protocol at a high level, such as to monitor the entity in a polling mode, or in an interrupt mode for interrupting faults on an indicated list of standard fault IDs {list of fault IDs} when network device monitoring and recovery system 100 detects an issue.

Monitoring proxy 110 may have its own policy which may indicate a frequency of polling the entities and other details. Monitoring proxy 110 may retrieve statistics or performance information for each entity based on the entity name. The fault reporting manager 122 reports any fault or anomaly by passing the logical device name. If an entity is operated in interrupt mode, the entity directly reports a fault or anomaly to monitoring proxy 110 which in turn reports the fault or anomaly to fault reporting manager 122.

Fault reporting manager 122 audits faults in an entity. If the entity has a fault recovery manager 124, fault reporting manager 122 sends details of a fault or anomaly with the logical device name to fault recovery manager 124. Fault reporting manager 122 may notify one or more client applications, such as a fault analytic client application if one is registered with monitoring proxy 110, of the fault or anomaly.

Fault recovery manager 124 may be implemented with two sub-modules: an entity level fault recovery manager for addressing fault recovery in a particular entity of the network device experiencing a fault or anomaly, and a device level fault recovery manager for addressing fault recovery across the entire network device. The entity level recovery manager looks up one or more recovery options based on the reported fault or anomaly and the logical device name, and drives recovery actions for the entity to recover from the fault or anomaly. The recovery actions may include a set of one or more operations that may be preprogrammed in a component or interface or may be defined by an administrator. For example, a recovery action may include to execute a set of recovery scripts, to reassign a set of communications from a determined faulty channel to a spare channel, or to reboot a component.

The entity level recovery manager may also send notifications to or perform actions with other entities that depend on the entity with the reported fault or anomaly, potentially both before and after recovery. In doing so, the entity level recovery manager may refer to the entry for a particular entity in the schema, which may indicate dependencies for each entity, or which other entities depend on a particular entity. The entity level recovery manager may then send notifications to or take other actions with respect to the dependent entities on the entity experiencing the fault or anomaly. Core logic 102 may transparently process notifications to or other actions with dependent entities generated by the entity level recovery manager of fault recovery manager 124. After a fault recovery with an entity, the system level fault recovery manager of fault recovery manager 124 may send notifications to or perform actions with the dependent entities to operate in a post-recovery status, which may include normal operation, throughput limitation, or operational limitation.

Network device monitoring and recovery system 100 may prepare a monitoring proxy application based on monitoring proxy application template 110 and a local policer/rehab application ("policer") based on local policer/rehab application template 112 for loading to the network device. A local policer/rehab may override the behavior of the monitoring proxy application if a response initiated by a proxy does not achieve an intended fault auditing or recovery result. For example, one particular component may experience and report a fault that prevents it from operating. That particular component may be connected to a set of dependent components that require that particular component for their normal operation. Monitoring proxy application template 110 may have a global default policy of deactivating the entire network device in case of the fault being reported by the particular component. However, local policer/rehab application template 112 may incorporate a customized local policy to override the global default policy and deactivating only those dependent components that require that particular component for their normal operation, while enabling the network device as a whole to continue operating in a restricted mode. Network device monitoring and recovery system 100 may provide one default policer, or specific policers configured for specific types of components.

Figure 4:
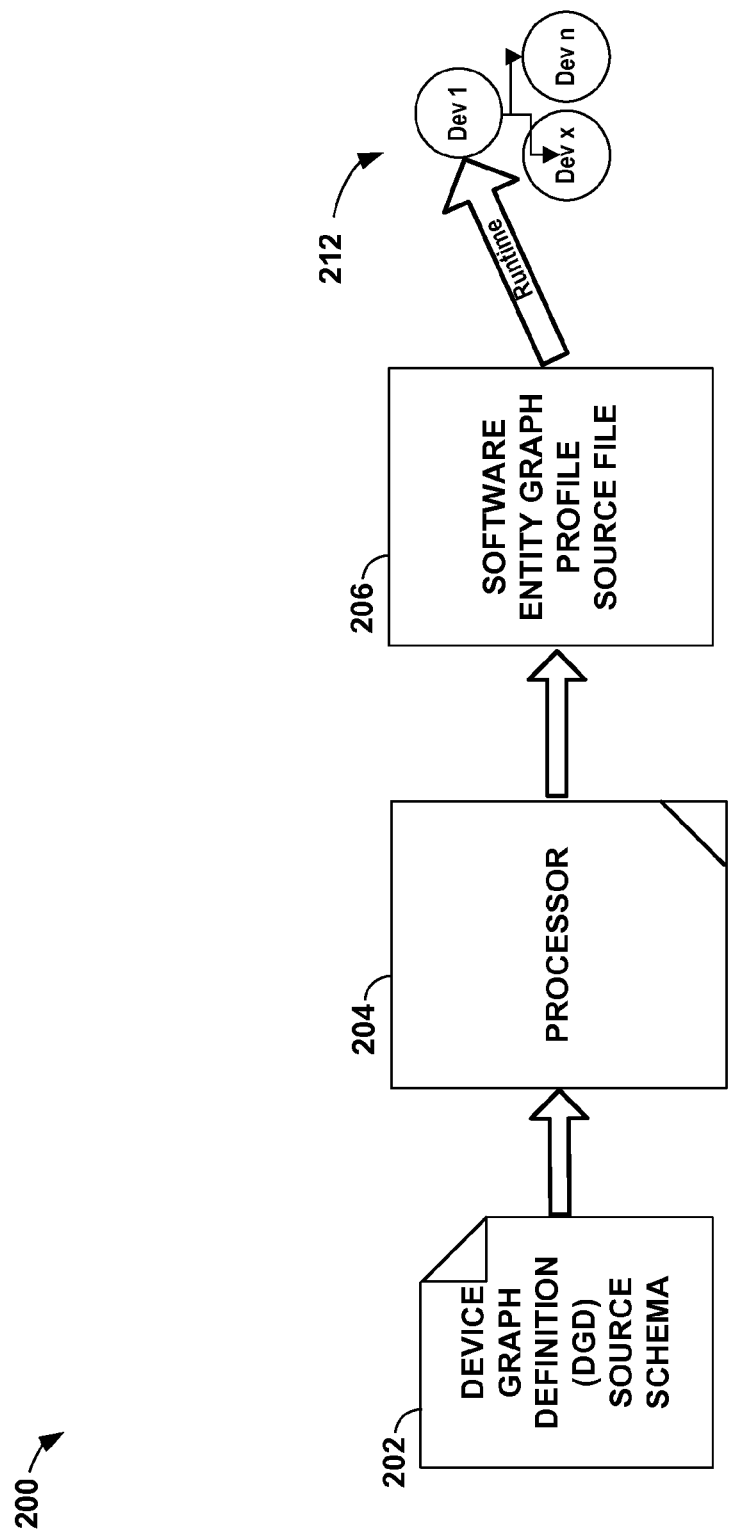
FIG. 4 is a block diagram illustrating an example process for generating a software graph profile of entity object instances based on a schema of router unit components and interfaces, and loading proxy applications based on the software graph profile to a plurality of the router unit components.

FIG. 4 is a conceptual diagram illustrating an example set of system features 200 that perform operations as part of network device monitoring and recovery system 100 may perform for generating a software entity graph profile source file 206 ("software entity profile 206") of entity instances based on a device graph definition (DGD) source schema 202 ("DGD schema 202") of network device entities (that corresponds to DGD 104 discussed above), and loading monitoring proxy applications (such as monitoring proxy 110 discussed above) based on software entity profile 206 to a plurality of the device component and interface object instances 212 ("entity object instances 212") of a network device, such as multi-chassis router 4 or network device 150 shown in FIGS. 1-3, at runtime. Entity object instances 212 may represent any of the entities of network device 150 as shown in FIG. 3 and described above. Processor 204 may implement core logic 102 to generate software entity profile 206 based on DGD schema 202. Processor 204 may be any processing unit or processing device of a network device monitoring and recovery system 100 or that may perform any of the methods described herein.

For example, DGD schema 202 may include an entry for each component interface of network device 150, where each entry may identify one or more of, but is not limited to: a primary component, the type of component of the primary, a peer component with which the primary component is interconnected, the type of the peer component, the interface (e.g., inter-integrated circuit (I2C) bus, peripheral component interconnect express (PCIe) bus, high-speed link 2 (HSL2) switch fabric) between the primary component and the peer component, and an interface ID ("IFID") for the interface. The IFIDs may be divided among major and minor IFIDs. Processor 204 may then use an external script (e.g., in Python or other suitable language) to generate software entity instances (e.g., as C structs or analogous typed instances in Python or other suitable language) to process the descriptions in DGD schema 202 and statically link and build up a tree corresponding to the interconnection structure among the device components during runtime.

Various types of interface connectivity schemes may be used in network devices, such as point-to-point, shared bus, and switch fabric. Processor 204 implementing core logic 102 of network device monitoring and recovery system 100 may generate entity instance objects for the interfaces based on the type of interface, assign unique IFIDs to each interface, and store the IFID in the entity instance object in software entity profile 206, as illustrated in the following examples.

Figure 5:
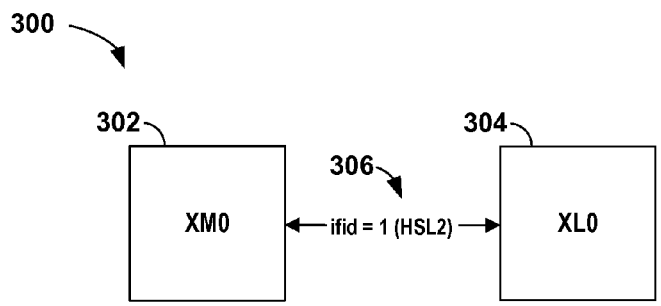
FIG. 5 is a block diagram illustrating an example group of network device components and interfaces providing a point-to-point connection between the router unit components in a network.

FIG. 5 is a conceptual block diagram illustrating an example group of network device entities in which an HSL2 switch fabric interface 306 provides a point-to-point connection between two network device components, a center chip XM0 302 and an LU ASIC XL0 304. The network device components in FIG. 5 may be included in an LCC or PFE as discussed above with reference to FIGS. 1 and 2, for example. Processor 204 may assign the HSL2 switch fabric interface 306 a simple IFID of "1(HSL2)." In other examples in which a switch fabric interface provides topologically more complex interconnections, processor 204 may incorporate indications of lanes or speed into the IFID.

Figure 6:
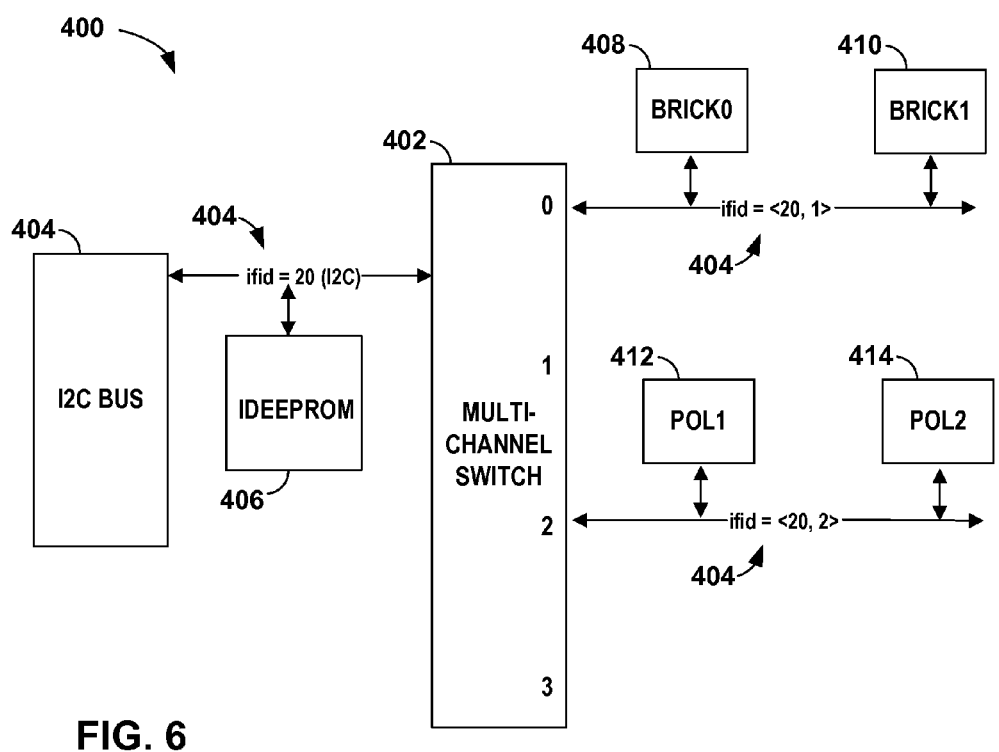
FIG. 6 is a block diagram illustrating an example group of network device components and interfaces providing shared bus connections between the router unit components in a network.

FIG. 6 is a conceptual block diagram illustrating an example group of network device entities in which an I2C bus 404 provides shared bus connections between a multi-channel switch 402 and various other device components

406, 408, 410, 412, 414. In this example, processor 204 may assign the I2C bus interface 404 a top-level IFID of "20 (I2C)" and assign hierarchically divided IFIDs such as <20,1>, <20,2>, etc. to each individual interface node provided by I2C bus 404 specified for each device component connected via I2C bus 404.

Figure 7:
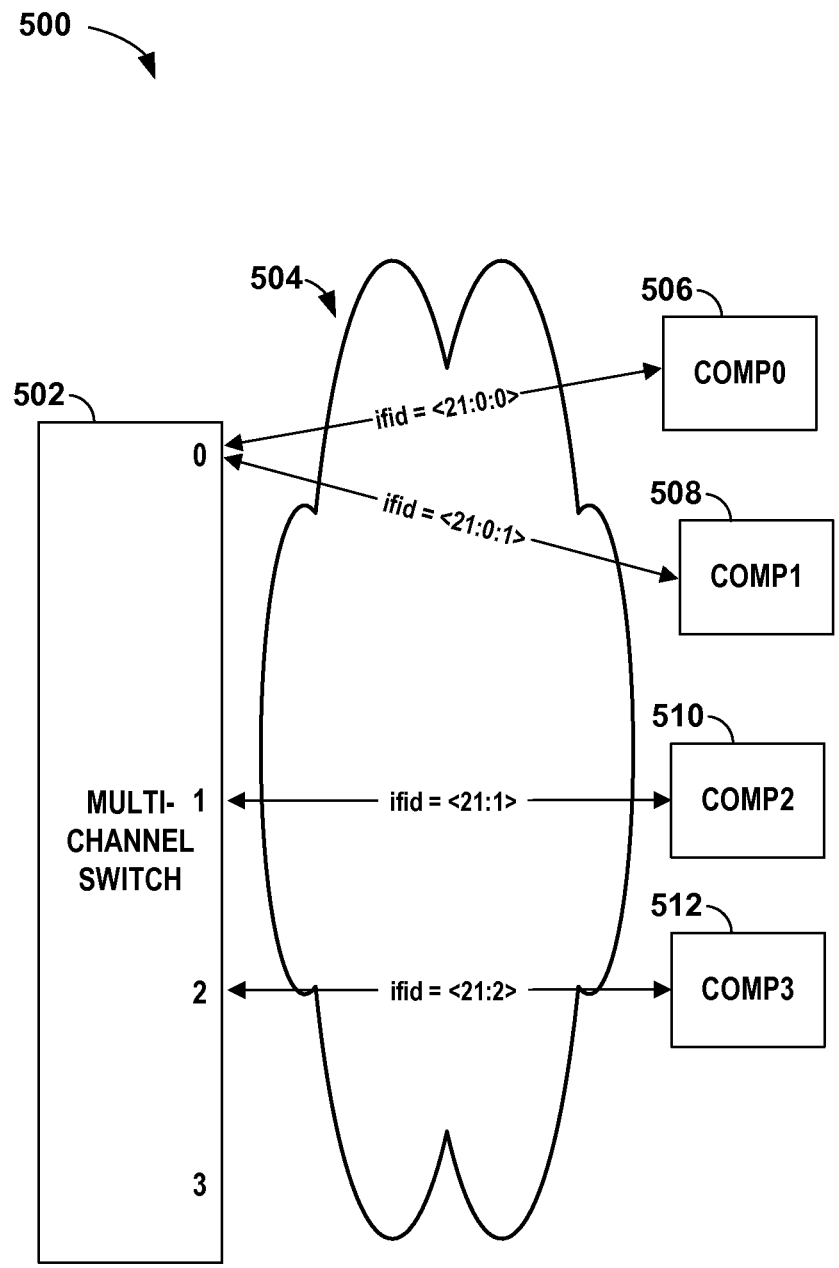
FIG. 7 is a block diagram illustrating an example group of network device components and interfaces providing switch fabric topological connections between the router unit components in a network.

FIG. 7 is a conceptual block diagram illustrating another example group of network device entities in which switch fabric 504 provides switch fabric interface connections between a multi-channel switch 502 and various other device components 506, 508, 510, and 512. In this example, processor 204 may assign the switch fabric interface 504 a top-level IFID of "21" and assign hierarchically divided IFIDs that specify individual ports of switch fabric interface 504 and individual lanes within the ports, when separately used to connect different component devices. Thus, processor 204 may assign three-tiered IFIDs <21:0:0>, <21:0:1> to device components 506, 508 that are each connected via a specified port of switch fabric interface 504 and specified lanes within that port. Processor 204 may also assign two-tiered IFIDs <21:1>, <21:2> to device components 510, 512 that are each connected via a specified port of switch fabric interface 504 without a sub-divided lane.

Processor 204 implementing core logic 102 of network device monitoring and recovery system 100, or a delegator of network device monitoring and recovery system 100, may generate a software entity profile in a variety of ways, including in a graph profile 206 that may be based on a DGD 104 or DGD schema 202 as discussed above, or in other formats such as a software entity table profile. (Throughout the rest of this description, the actions of network device monitoring and recovery system 100 such as to probe the entities of a network device, generate a tree representation of interconnections among entities of the network device, and generate a software entity profile of the entities of the network device, may be performed by a delegator of network device monitoring and recovery system 100 implemented on the network device.) Core logic 102 (e.g., executing on processor 204) may generate a device tree representation of the entities in the network device as part of generating the software entity profile in any of various formats. The "tree" representation reflects that typically, each component included in the network device has information on its directly connected interfaces, and an interface included in the network device has information on its directly connected components, but a particular interface does not contain information on the next hop interfaces on the other side of the components to which the particular interface is connected.

To dynamically probe a logic device and generate a tree representation of the network device, core logic 102 may determine a root or master component, such as a CPU of the network device, which may correspond to master microprocessor 52 shown in FIG. 2, and assign that root or master component as the head of the tree. Core logic 102 may then logically proceed through determining the interfaces connected to the root component and assigning those interfaces as connected to the head of the tree, determine the components connected to those interfaces and assign those components to nodes of the tree connected to the interfaces connected to the head of the tree, and so forth, until core logic 102 has generated a tree representing all (or at least some) of the components and interfaces of the network device. For example, core logic 102 may determine that the CPU is connected via I2C bus interfaces to one or more modular port concentrators (MPCs), and that the MPCs are in turn are connected via I2C bus interfaces to a multi-channel switch, a center chip, and an LU ASIC, and other components. Core logic 102 may determine that the center chip and the LU ASIC are interconnected with each other via an HSL2 interface, and that the MPCs are interconnected via a PCIe bus interface to a modular interface card (MIC) field-programmable gate array (FPGA), a MIC connector, and a MIC. Core logic 102 may generate and store a graph representing these components as nodes and these interfaces connecting the components as adjacencies connecting the nodes and assigned with unique IFIDs.

Core logic 102 (or a delegator of network device monitoring and recovery system 100) may assign each interface a unique IFID and logical interface address, as discussed above, when core logic 102 first dynamically probes or scans the network device. Core logic 102 may also read or receive the device ID for each hardware component in the network device, and assign one or more logical node addresses to each component to represent that particular device's status as a node in the tree representation. Core logic 102 may assign a particular hardware component one logical node address per each of the interfaces to which it's connected and with which it forms a node.

In some implementations, core logic 102 may dynamically probe the components and interfaces, and may implement a software entity profile as a software entity graph profile. Core logic 102 may generate a hash tree based on the IFIDs as the key, and the nodes as the data. Processor 204 may then look up interfaces using the hash tree, in which each device node is directly connected to an interface with a unique IFID. Processor 204 may cache frequently accessed interfaces. Processor 204 may implement switch ports as an array of pointers to the network device.

Processor 204 may also generate delegators of network device monitoring and recovery system 100, including command delegators and response delegators for the components and interfaces, and link the delegators to the component nodes in the tree. Subsequently, network device monitoring and recovery system 100 may pass an action (e.g., a recovery action) indicated for a respective component to a delegator connected to the component node in the graph that corresponds to the component node. A delegator may abstract underlying drivers, toolkits, or utilities for the components and interfaces, so that other functions of network device monitoring and recovery system 100 can interact with the interfaces without tracking changes in the drivers, toolkits, or utilities. Network device monitoring and recovery system 100 may thus implement the software entity profile as a graph profile in which all of the components and interfaces are represented as nodes in a tree representation of the network device.

In some implementations, core logic 102 may implement a software entity profile as a software entity table profile, which may be simpler and which core logic 102 may build up by storing information from specific interactions with the entities in the network device. For example, core logic 102 or a proxy 110 may seek to establish a path from a CPU of the network device with a component ID of "1" and a logical address of "30.0/31-0.0" to another component of the network device with a component ID of "19.1" and a logical address of "19-1.0" and without a direct interface to the CPU. Core logic 102 or proxy 110 may initiate a process to send requests for a connection path to component 19.1 through the interfaces connected to the CPU, such that connected components or interfaces may reply with the directly connected interfaces or components they have information on, and the requests may propagate through the components and interfaces until one or more connective paths are established between the CPU and component 19.1.

Core logic 102 or proxy 110 may record the one or more connective paths between the CPU and component 19.1 in a lookup table, with interface addresses, component addresses, pass node or next hop interface addresses, numbers of hops, and potentially, administrative preferences about which connective path to use. Core logic 102 may then generate a software entity table profile as it accumulates lookup table entries. Network device monitoring and recovery system 100 may thus implement the software entity profile as a table profile in which at least two or more of the components and at least one or more of the interfaces are represented in an interconnection path lookup table.

Figure 8:
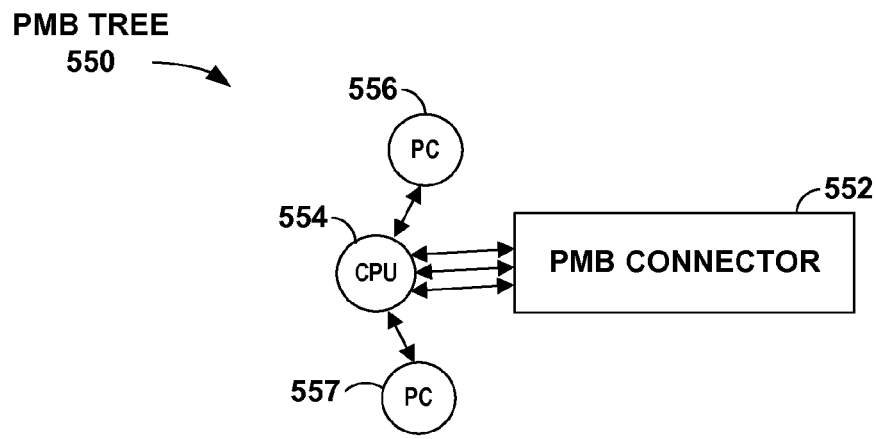
FIG. 8 is a conceptual diagram illustrating three example interconnection trees, including connectors, that a core logic of a network device diagnostic and recovery system may derive from a DGD or from dynamically probing the interconnections among the entities, to represent interconnections among entities in a network device.
Figure 8:
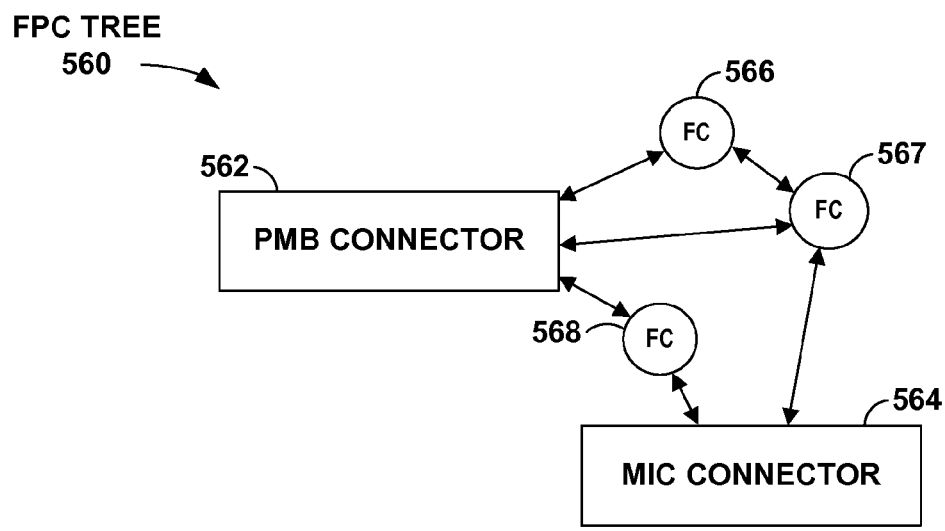
Figure 8:
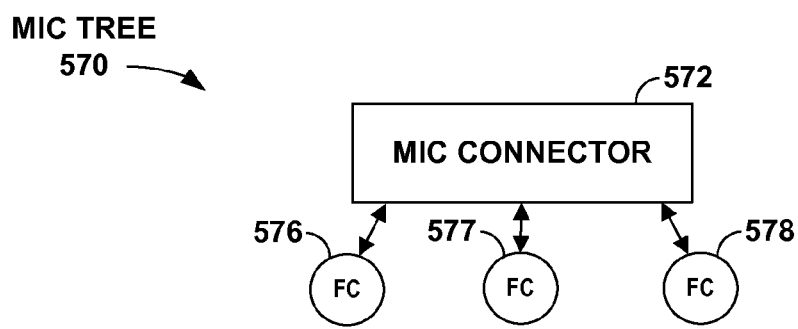

FIG. 8 is a conceptual diagram illustrating three example interconnection trees 550, 560, 570, including connectors, that core logic 102 (e.g., via a delegator of network device monitoring and recovery system 100) may derive from DGD 104 or from dynamically probing the interconnections among the entities, to represent interconnections among entities in a network device. Interconnection trees 550, 560, 570 are example interconnection representations based at least in part on the DGD. Network device monitoring and recovery system 100 generating the software entity profile may include generating one or more of network device graph 150 of FIG. 3 and/or interconnection trees 550, 560, 570. Network device monitoring and recovery system 100 may perform an inter-component path test using interconnection representations such as network device graph 150 and/or interconnection trees 550, 560, 570 to dynamically probe and do inter-component path tests among the hardware components and interfaces between the hardware components in the network device. Core logic 102 or a delegator may use one of interconnection trees 550, 560, 570 for inter-component path tests, for fault notification, and/or for fault recovery, for example.

Processor subsystem (PMB) interconnection tree 550 includes a PMB connector 552 interconnected to a CPU 554, which in turn is interconnected to PMB hardware components (PCs) 556 and 557. PMB connector 552 has three interconnection paths with CPU 554, one for each of the three hardware components of CPU 554, PC 556, and PC 557. Flexible physical interface card (PIC) concentrator (FPC) interconnection tree 550 includes a PMB connector 562 interconnected to three FPC hardware components (FCs) 566, 567, 568, which in turn are interconnected to a modular interface card (MIC) connector 564. FCs 567 and 568 are directly interconnected to MIC connector 564, while FC 566 is interconnected to MIC connector 564 via FC 567. MIC tree 570 includes a MIC connector 572 directly interconnected to three MIC hardware components (MCs) 576, 577, 578. In the respective trees 550, 560, 570, PMB connectors 552 and 562 and MIC connectors 564 and 572 may enable the entities to be treated as modular and may support hot swap, so the network device can remain online during fault recovery, even if fault recovery includes removing and replacing a faulty hardware component, e.g., among PCs 556 and 557, FCs 566, 567, and 568, and MCs 576, 577, and 578.

Figure 9:
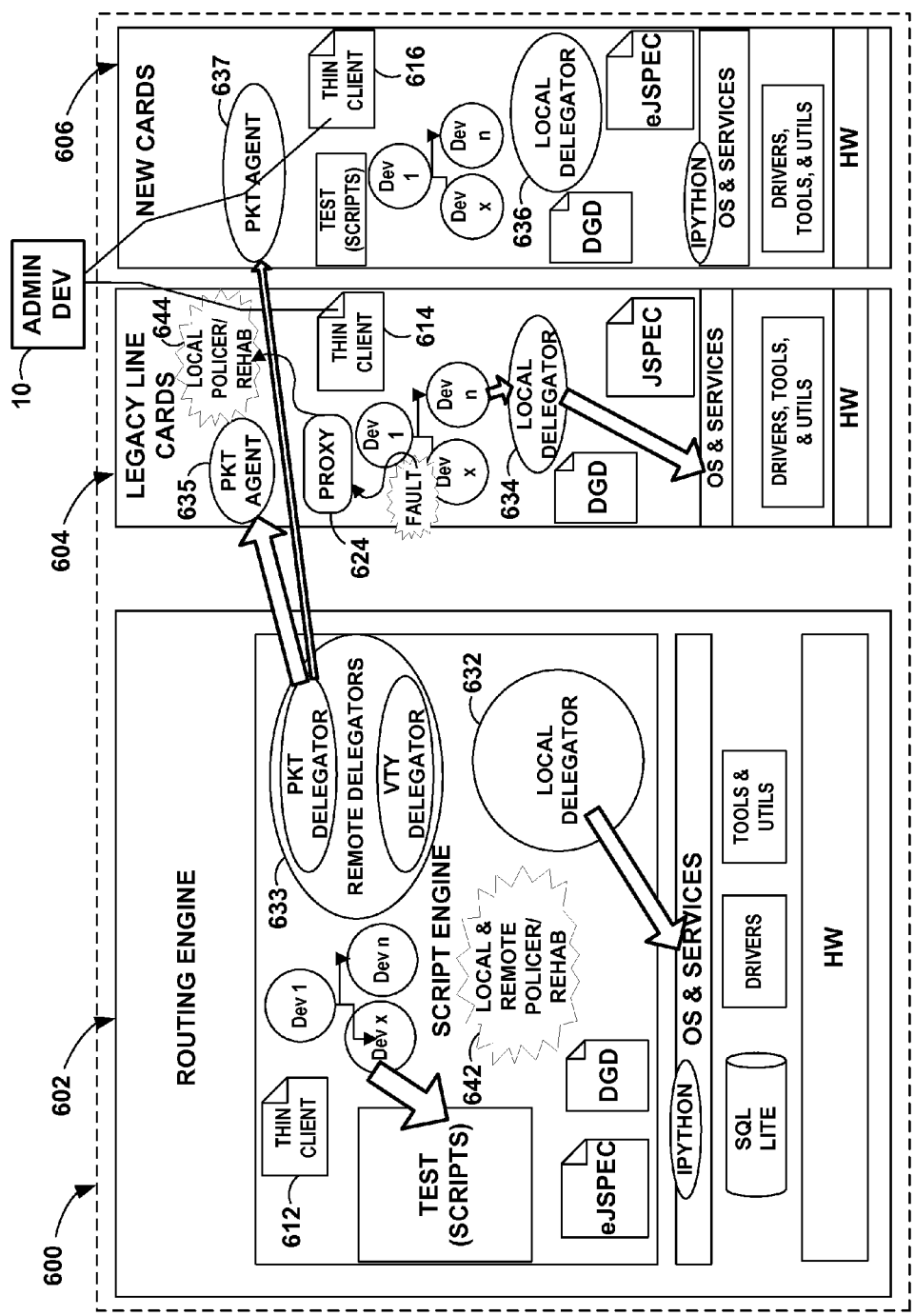
FIG. 9 is a conceptual block diagram illustrating a routing engine and interface cards executing proxy applications based on the software graph profile for communicating diagnostic monitoring and fault information to the online network diagnostic monitoring and fault recovery system, according to an illustrative implementation.

FIG. 9 is a conceptual diagram illustrating a network device 600 with a routing engine 602, legacy line interface cards 604, and new interface cards 606 implementing thin clients 612, 614, 616 ("thin clients 612-616"), proxies 624, delegators 632, 633, 634, 635, 636, 637 ("delegators 632-637"), and policers 642, 644 of a network device monitoring and recovery system 100, according to an illustrative implementation. Network device 600 of the example of FIG. 9 may correspond to multi-chassis router 4 of FIGS. 1 and 2 in some examples, with routing engine 602 in FIG. 9 corresponding to control plane 69 and routing engine 32 in FIG. 2, and legacy line interface cards 604 and new interface cards 606 as in FIG. 9 corresponding to forwarding plane 63 and interface cards 42, 48 as in FIG. 2. A user may access thin clients 612, 614, 616 of network device monitoring and recovery system 100 executing on network device 600 via administrator device or bench device 10. The delegators on network device 600 including representative delegators 632-637 may include a command delegator of network device monitoring and recovery system 100 assigned to each device node and interface node of a software entity profile. Delegators 632-637 may be registered to a lookup tree by unique delegator names and with data indicating a pointer to the respective delegator. When network device monitoring and recovery system 100 initializes a software entity profile, core logic 102 may look up delegators by name. Delegators 632-637 may execute tests, such as dynamic path tests to dynamically probe network device 600 to identify the hardware components and interfaces between the hardware components in network device 600, and may generate interconnection representations such as interconnection graphs, tables, or trees, such as network device graph 150 or interconnection trees 550, 560, 570 as shown in FIGS. 3 and 8 and discussed above. Delegators 632-637 may use an underlying operating system or tool kit services to communicate test responses to response delegators included among delegators 632-637. The response delegators may select where to communicate the test responses.

Thin clients 612-616 may provide a common user interface (UI) client for network device monitoring and recovery system 100 across all interface cards of network device 600. Thin clients 612-616 may be available to use on stand-alone cards, and are local to respective cards on which they are installed.

In an example usage scenario, a component on network device 600 fails, and core logic 102 or monitoring proxy 110 receives the component name and the fault ID from the driver for the failed component. Proxy 110 may look up a policy in network device monitoring and recovery system 100 based on the component name and the fault ID. The policy may, for example, indicate to notify all components about the fault, diagnose the fault, and perform recovery actions. Proxy 110 may then communicate the component name and fault ID to fault reporting manager 122 to communicate to all of the other components in network device 600. Other components connected to the faulty component may adjust their operation to adapt to the failure. Proxy 110 may perform a diagnosis of the faulty component and communicate the results of the diagnosis to fault recovery manager 124, which performs recovery actions on the failed component. Fault recovery manager 124 also communicates a notification of the recovery actions to the other components connected to the component that had experienced the failure.

Figure 10:
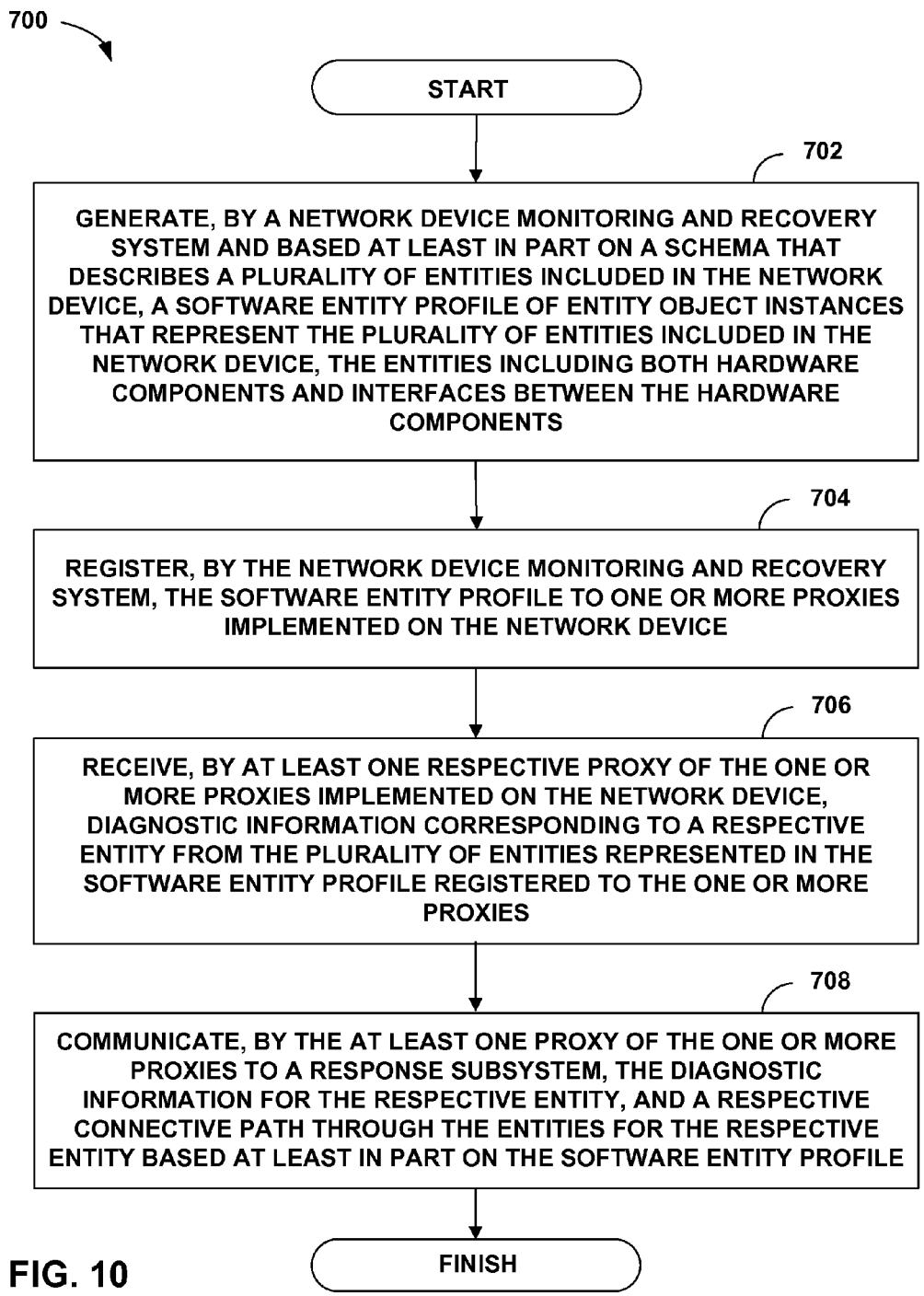
FIG. 10 is a flowchart illustrating an example process of operation for an online network diagnostic monitoring and fault recovery system connected to a network.

FIG. 10 is a flowchart illustrating an example process 700 of operation for an online network diagnostic monitoring and fault recovery system connected to a network. Process 800 includes generating, by a network device monitoring and recovery system (e.g., network device monitoring and recovery system 100) and based at least in part on a schema that describes a plurality of entities included in the network device (e.g., router 4), a software entity profile of entity object instances that represent the plurality of entities included in the network device, the entities including both hardware components and interfaces between the hardware components (702). Process 700 includes registering, by the network device monitoring and recovery system, the software entity profile to one or more proxies (e.g., monitoring proxy 110) implemented on the network device (704). Process 700 includes receiving, by at least one respective proxy of the one or more proxies implemented on the network device, diagnostic information corresponding to a respective entity from the plurality of entities represented in the software entity profile registered to the one or more proxies (706). Process 700 further includes communicating, by the at least one proxy of the one or more proxies to a response subsystem, the diagnostic information for the respective entity, and a respective connective path through the entities for the respective entity based at least in part on the software entity profile (708).

A number of embodiments of the present invention have been described. Nevertheless, it will be understood that various modifications may be made without departing from the spirit and scope of the invention. Accordingly, other embodiments are within the scope of the following claims.

What is claimed is:

1. A method for online network device diagnostics, the method comprising:
    generating, by a network device monitoring and recovery system and based at least in part on a schema that describes a plurality of entities included in a network device, a software entity profile of entity object instances that represent the plurality of entities included in the network device, the entities including both hardware components and interfaces between the hardware components;
    registering, by the network device monitoring and recovery system, the software entity profile to one or more proxies implemented on the network device;
    receiving, by at least one respective proxy of the one or more proxies implemented on the network device, diagnostic information corresponding to a respective entity from the plurality of entities represented in the software entity profile registered to the one or more proxies; and
    communicating, by the at least one proxy of the one or more proxies to a response subsystem, the diagnostic information for the respective entity, and a respective connective path through the entities for the respective entity, based at least in part on the software entity profile.

2. The method of claim 1, further comprising:
    loading the schema that describes the plurality of entities included in the network device, prior to generating the software entity profile.

3. The method of claim 1, wherein the schema comprises a device graph definition (DGD) and wherein generating the software entity profile comprises generating an interconnection representation based at least in part on the DGD, the method further comprising:
    performing an inter-component path test using the interconnection representation to probe the hardware components and interfaces between the hardware components in the network device.

4. The method of claim 1, wherein generating the software entity profile of the entity object instances comprises generating object instances for at least some of the hardware components in the network device based at least in part on a component class that provides a software and data structure as a general basis for specific instances of network device components, and generating object instances for at least some of the interfaces in the network device based at least in part on an interface class that provides a software and data structure as a general basis for specific instances of network device interfaces.

5. The method of claim 1, wherein generating the software profile of entity object instances comprises generating a graph in which all of the components are represented as nodes of the graph and interfaces are represented as adjacencies between the nodes of the graph.

6. The method of claim 1, wherein generating the software profile of entity object instances comprises generating a table profile in which at least two or more of the components and at least one or more of the interfaces are represented in an interconnection path lookup table.

7. The method of claim 1, further comprising:
    detecting a fault in a particular entity among the plurality of entities,
    wherein communicating the diagnostic information comprises communicating the diagnostic information to a fault reporting manager, the method further comprising:
    communicating, by the fault reporting manager, a notification of the fault and an identification of the particular entity to at least some of the entities.

8. The method of claim 1, further comprising:
    detecting a fault in a particular entity among the entities;
    wherein communicating the diagnostic information comprises communicating the diagnostic information to a fault recovery manager, the method further comprising:
    performing, by the fault recovery manager, a recovery action on the particular entity.

9. The method of claim 1, further comprising performing a policer override of the one or more proxies to select a different action than an action initiated by the one or more proxies.

10. The method of claim 1, wherein the hardware components in the network device comprise one or more of: a master switch control board, a backup switch control board, a nonredundant switch control board, a master routing engine, a backup routing engine, a nonredundant routing engine, a solid-state drive (SSD) of a routing engine, a physical interface card (PIC), a modular interface card (MIC), a flexible PIC concentrator (FPC), a dense port concentrator (DPC), and a modular port concentrator (MPC).

11. The method of claim 1, wherein the interfaces between the hardware components comprise one or more of: a point-to-point interconnection, a bus interconnection, and a switch fabric interconnection.

12. The method of claim 1, wherein the interfaces between the hardware components comprise one or more of: an inter-integrated circuit (I2C) bus, a peripheral component interconnect express (PCIe) bus, and a high-speed link 2 (HSL2) switch fabric.

13. A network device having an online network diagnostic monitoring and fault recovery system loaded thereon, the online network diagnostic monitoring and fault recovery system comprising:
    a network device monitoring and recovery system; and
    one or more proxies implemented on the network device,
    wherein the network device monitoring and recovery system is configured to:
        generate, based at least in part on a schema that describes a plurality of entities included in the network device, a software entity profile of entity object instances that represent the plurality of entities included in the network device, the entities including both hardware components and interfaces between the hardware components; and register the software entity profile to the one or more proxies implemented on the network device, and wherein at least one respective proxy of the one or more proxies implemented on the network device is configured to:

receive diagnostic information corresponding to a respective entity from the plurality of entities represented in the software entity profile registered to the one or more proxies; and communicate the diagnostic information for the respective entity, and a respective connective path through the entities for the respective entity, based at least in part on the software entity profile.

14. The network device of claim 13, wherein the network device monitoring and recovery system being configured to generate the software entity profile of the entity object instances comprises the network device monitoring and recovery system being configured to generate object instances for at least some of the hardware components in the network device based at least in part on a component class that provides a software and data structure as a general basis for specific instances of network device components, and the network device monitoring and recovery system being configured to generate object instances for at least some of the interfaces in the network device based at least in part on an interface class that provides a software and data structure as a general basis for specific instances of network device interfaces.

15. The network device of claim 13, wherein the network device monitoring and recovery system being configured to generate the software entity profile of entity object instances comprises the network device monitoring and recovery system being configured to generate a graph in which all of the components are represented as nodes of the graph and interfaces are represented as adjacencies between the nodes of the graph.

16. The network device of claim 13, wherein the online network diagnostic monitoring and fault recovery system further comprises:

a fault reporting manager; and a fault recovery manager, wherein the at least one respective proxy of the one or more proxies implemented on the network device is configured to detect a fault in a particular entity among the plurality of entities, wherein the at least one respective proxy of the one or more proxies being configured to communicate the diagnostic information comprises the at least one respective proxy of the one or more proxies being configured to communicate the diagnostic information to a fault reporting manager and a fault recovery manager, wherein the fault reporting manager is configured to communicate a notification of the fault and an identification of the particular entity to at least some of the entities, and wherein the fault recovery manager is configured to perform a recovery action on the particular entity.

17. The network device of claim 13, wherein the network device comprises a router.

18. A computer program product comprising a computer-readable medium that comprises instructions that cause at least one programmable processor to:

implement one or more proxies on a network device;

generate, based at least in part on a schema that describes a plurality of entities included in a network device, a software entity profile of entity object instances that represent the plurality of entities included in the network device, the entities including both hardware components and interfaces between the hardware components;

register the software entity profile to one or more proxies implemented on the network device;

cause at least one respective proxy of the one or more proxies implemented on the network device to receive diagnostic information corresponding to a respective entity from the plurality of entities represented in the software entity profile registered to the one or more proxies; and cause the at least one proxy of the one or more proxies to communicate, to a response subsystem, the diagnostic information for the respective entity, and a respective connective path through the entities for the respective entity, based at least in part on the software entity profile.

19. The computer program product of claim 18, wherein the instructions that cause the at least one programmable processor to generate the software entity profile of the entity object instances comprise instructions that cause the at least one programmable processor to generate object instances for at least some of the hardware components in the network device based at least in part on a component class that provides a software and data structure as a general basis for specific instances of network device components, and instructions that cause the at least one programmable processor to generate object instances for at least some of the interfaces in the network device based at least in part on an interface class that provides a software and data structure as a general basis for specific instances of network device interfaces.

20. The computer program product of claim 18, wherein the instructions that cause the at least one programmable processor to generate the software entity profile of entity object instances comprise instructions that cause the at least one programmable processor to generate a graph in which all of the components are represented as nodes of the graph and interfaces are represented as adjacencies between the nodes of the graph.

21. The computer program product of claim 18, wherein the computer-readable medium further comprises instructions that cause the at least one programmable processor to cause the at least one proxy of the one or more proxies implemented on the network device to detect a fault in a particular entity among the plurality of entities, wherein the instructions that cause the at least one programmable processor to cause the at least one proxy of the one or more proxies to communicate the diagnostic information comprise instructions that cause the at least one programmable processor to cause the at least one proxy to communicate the diagnostic information to the fault reporting manager and the fault recovery manager, wherein the computer-readable medium further comprises instructions that cause the at least one programmable processor to:

cause the fault reporting manager to communicate a notification of the fault and an identification of the particular entity to at least some of the entities, and cause the fault recovery manager to perform a recovery action on the particular entity.

* * * * *